United States Patent [19]

Curry

[11] Patent Number: 4,672,944
[45] Date of Patent: Jun. 16, 1987

[54] MINI-KITCHEN

[76] Inventor: Raymond L. Curry, 5306 Nelson Ave., Baltimore, Md. 21215

[21] Appl. No.: 867,504

[22] Filed: May 28, 1986

[51] Int. Cl.[4] .............................................. A47J 37/07
[52] U.S. Cl. ..................................... 126/25 R; 126/2; 126/5; 126/9 R; 99/339
[58] Field of Search .................. 126/2, 9 R, 25 R, 33, 126/369, 38, 5; 99/339, 401

[56] References Cited

U.S. PATENT DOCUMENTS

| | | | |
|---|---|---|---|
| 1,024,521 | 4/1912 | Mills et al. | 126/5 X |
| 2,009,189 | 7/1935 | Ash | 126/25 R |
| 2,053,935 | 9/1936 | Austin | 99/339 X |
| 2,925,028 | 2/1960 | Haynes et al. | 126/25 R |
| 3,060,920 | 10/1962 | Dibert | 126/276 |
| 3,306,280 | 2/1967 | Vannoy | 126/25 R |
| 3,380,444 | 4/1968 | Stalker | 126/9 R X |
| 3,438,364 | 4/1969 | Galloway | 126/25 R |
| 3,447,445 | 6/1969 | Koziol | 99/339 X |
| 3,693,534 | 9/1972 | Martin | 126/25 R |
| 3,866,994 | 2/1975 | Bonin | 126/25 R |
| 3,874,531 | 4/1975 | Mayo | 414/684 |
| 4,165,683 | 8/1979 | Van Glist | 99/393 |
| 4,518,189 | 5/1985 | Belt | 296/22 |
| 4,587,948 | 5/1986 | Haglund | 126/38 |

Primary Examiner—Samuel Scott
Assistant Examiner—Allen J. Flanigan
Attorney, Agent, or Firm—John F. McClellan, Sr.

[57] ABSTRACT

A portable charcoal-heated cooking system for mounting to the coaming of a pick-up truck bed has a steam chamber and a grill chamber, each partly defined by a multiple flat-plate-reflection housing structure that in the grill chamber evens-out radiant heating between the grill edges and central portion. The housing structure also reduces volume necessary for a given cooking requirement. Rain shedding and liquid drainage provisions keep the system ready for use.

12 Claims, 4 Drawing Figures

MINI-KITCHEN

FIELD OF THE INVENTION

This invention relates generally to food preparation equipment and specifically to stoves.

BACKGROUND OF THE INVENTION

Cooking apparatus has been shown in U.S. patents, including the following:

U.S. Pat. No. 3,060,920 to A. F. Dibert, Oct. 30, 1962, showed a mobile barbecue system that could be transported on a motor vehicle; grill and oven are supplied.

U.S. Pat. No. 3,306,280 to J. W. Vannoy, Feb. 28, 1967, showed a two-compartment charcoal grill with movable top, ash removal and drip pan, handles and vent. The legs are removable.

U.S. Pat. No. 3,438,364 to L. A. Galloway, Jr., Apr. 15, 1969, showed a grill with a water baffle between portions thereof, hinged hood, temperature indicator, water jacket that provides steam as a tenderizer.

U.S. Pat. No. 3,693,531 to N. L. Martin, Sept. 26, 1972, a plural-compartment cooking unit with pedestal type leg that could be bolted to a vehicle. One of the compartments is a bake oven and one is for grilling. Gaseous fuel may be used. Charcoal or chips may be used, supported on racks, and combustion air passages are provided.

U.S. Pat. No. 3,866,994 to T. E. Bonin, Feb. 18, 1975, showed a compartmented unit.

U.S. Pat. No. 3,874,531 to William D. Mayo, Apr. 1, 1975, showed a portable grill.

SUMMARY OF THE INVENTION

No system of food preparation is known to provide the combination of advantages of the present invention, and a first object is to provide a system that attaches to the coaming of a pick-up truck and provides a portable combination grill and steaming oven with unique radiant heating reflection features for superior food preparation combined with speed and ease of operation and weather protection. Coaming is used in the ordinary sense of the dictionary definition, a raised frame.

Further objects are to provide a low-cost, sanitary, safe, lightweight, quick heating system as described that can be shut down and moved to another location at a moment's notice and immediately put into operation again.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
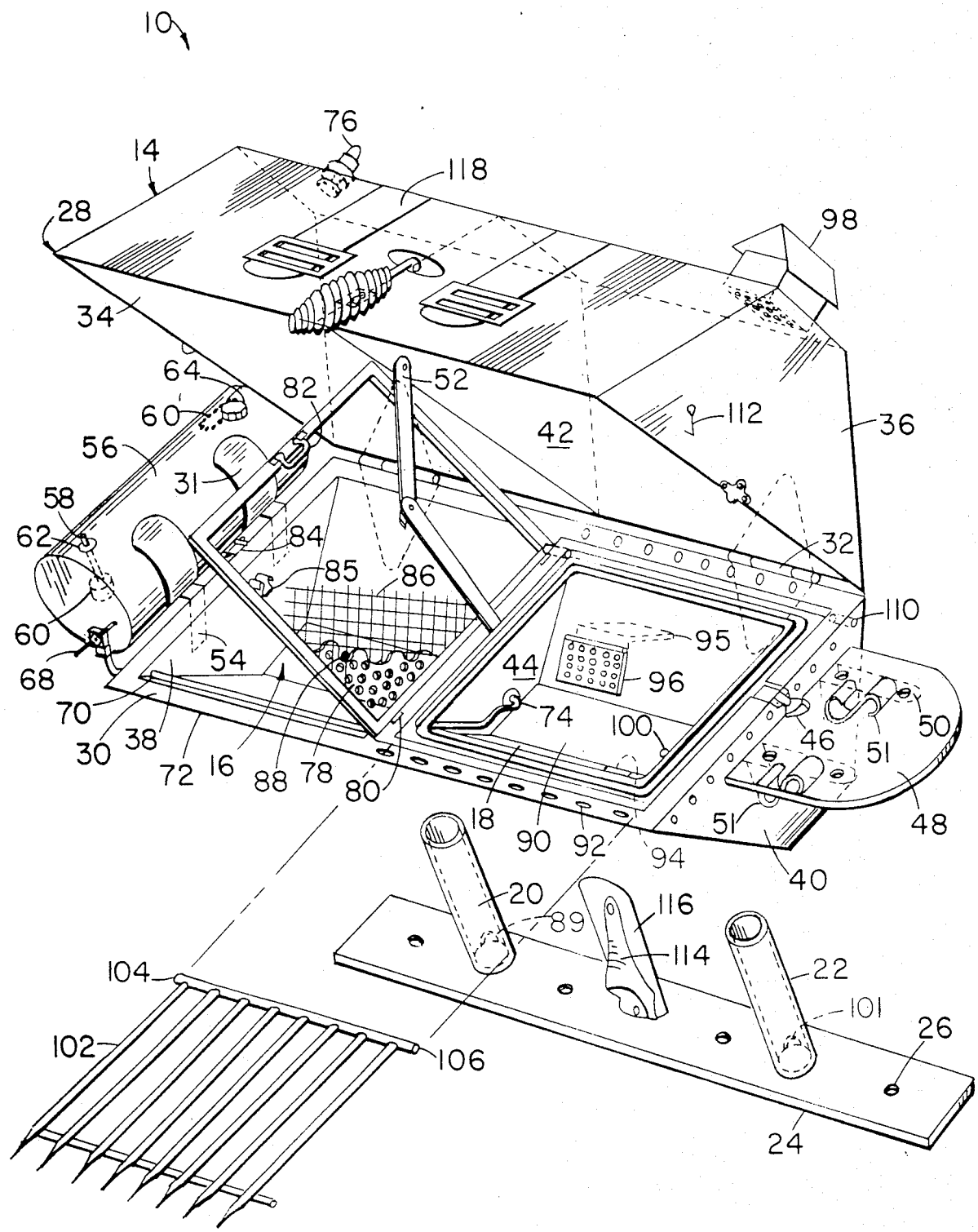
FIG. 1 is a partly exploded perspective view of a preferred embodiment of the invention.

FIG. 1 shows embodiment 10 of the system in top-open mode. In this preferred embodiment the system is approximately 27 inches (64 cm) long, 17 inches (43 cm) high, 11½ inches (30 cm) deep, and weighs approximately 35 pounds (16 Kg).

Principal features of the housing 14 include a steam chamber 16 and a grill chamber 18. First and second legs 20, 22 support the weight and aid drain-off. The legs have a flat iron strap 21 with holes 26 in it, to connect to the bed of a pick-up truck.

The system has a concave top unit 28 of the housing, hinged horizontally to a similar concave bottom unit 30 symmetrically disposed about the hinge 32, and for defining a multiple-reflection course or path for radiant heating the top unit and the bottom unit have flat plate reflector construction. This construction results in the cross-sectional shape of an irregular hexagon, in the closed mode, as will be described.

The ends 34, 36, 38, 10 of each unit 28, 30 are closed by flat plates of trapezoidal shape that meet at the horizontal centerplane, and similarly a transverse partition of the same shape and similar connection to the units separates in each of the upper and lower units of the housing into a grill chamber and a steam chamber. Upper partition part shows at 42 and lower at 44.

A trunk-latch type lock 46 at the end maintains the housing closed, when desired.

At the end opposite the tank, or second end, a wooden service shelf 48 fixed with brackets 50 to the end, provides a place to set food and utensils while cooking or serving; 51 are braces. For baking or cooking with the system closed, by means of provisions herein, a charcoal fire under a grill substantially deeper than the fire as measured front-to-back, sets up a supplemental radiation path that heats the marginal areas of the grill by repeated reflection, giving a more even and efficient cooking action, than if only direct-upward heat were used, as will be seen.

To maintain the system open, an elbow brace 52 pivoted to the lower half parition 44 and to the upper half partition 42, holds up the upper unit 28; in open position it overhangs and shields the lower unit 30 to a degree.

Fixed by brackets 54 to the first end of the housing, outside the enclosure, is a polyethylene or other suitable plastic water tank 56 that may be ten inches (25 cm) in length and four inches (10 cm) in diameter. Water level indicator 58, which may be of the type having a float 60 with a graduated plunger 62 extending up through an opening, is at the front of the tank.

At the back top portion of the tank is a capped filler 64; the cap preferably has a chain 60' to prevent loss.

A valve 68 at the bottom front controls flow of water from the tank down a copper tube 70 that extends at a decline past the front edge 72 of the bottom unit 30, and around the edges of the grill chamber 18 twice or more and into the bottom of the steam chamber 16 through a hole 74 in partition 41. This provides steam to keep food hot and soft.

To provide a directed steam escape when the system is closed, a ventilator or valve 76 is fixed through the top over the steam chamber or compartment 16.

Inside the steam compartment is a perforate plate 78, shown raised for clarity, that has a hinge 80, a handle 82, and to hold it down, at 84, 85, a conventional catch or locking mechanism, corresponding to trunk latch 46 on the other end, and resting on the plate is a rack 86 that keeps food off the plate. In the bottom of the steam compartment is a water drain-off 88 that runs through the leg 20 under the steam compartment and drains at 89.

The grill compartment 18 holds charcoal in the narrow, wedge-shaped bottom portion 90. Ventilating holes 92 are provided along the edges of the lower or second unit 18.

Providing air for combustion is a hinged door 94 with a screen over it; when hinged open, this door provides for ash removal. It has a cover plate for closing-off the interior.

A similar door 96 at the back provides ventilation but does not provide for ash-removal, with lid 95.

At the top end portion of the second or top unit 14 a chimney 98 with rain deflector roof vents the interior.

A drain hole 100 leads from the bottom of the grill compartment down the second leg 22 and drains at 101.

In the grill chamber or compartment 18 the grill 102 that covers it hinges up on hinge portions 104, 106 co-acting with matching openings 110 in the housing, and can be held there by a latching device or hook 112 on the cover, to permit easy charcoal-adding access to the area below the grill and easy cleaning. This charcoal holding area is much narrower, front to back, than the grill 102.

A bottle opener 114 is held between the leg locations on a strip 116.

Figure 2:
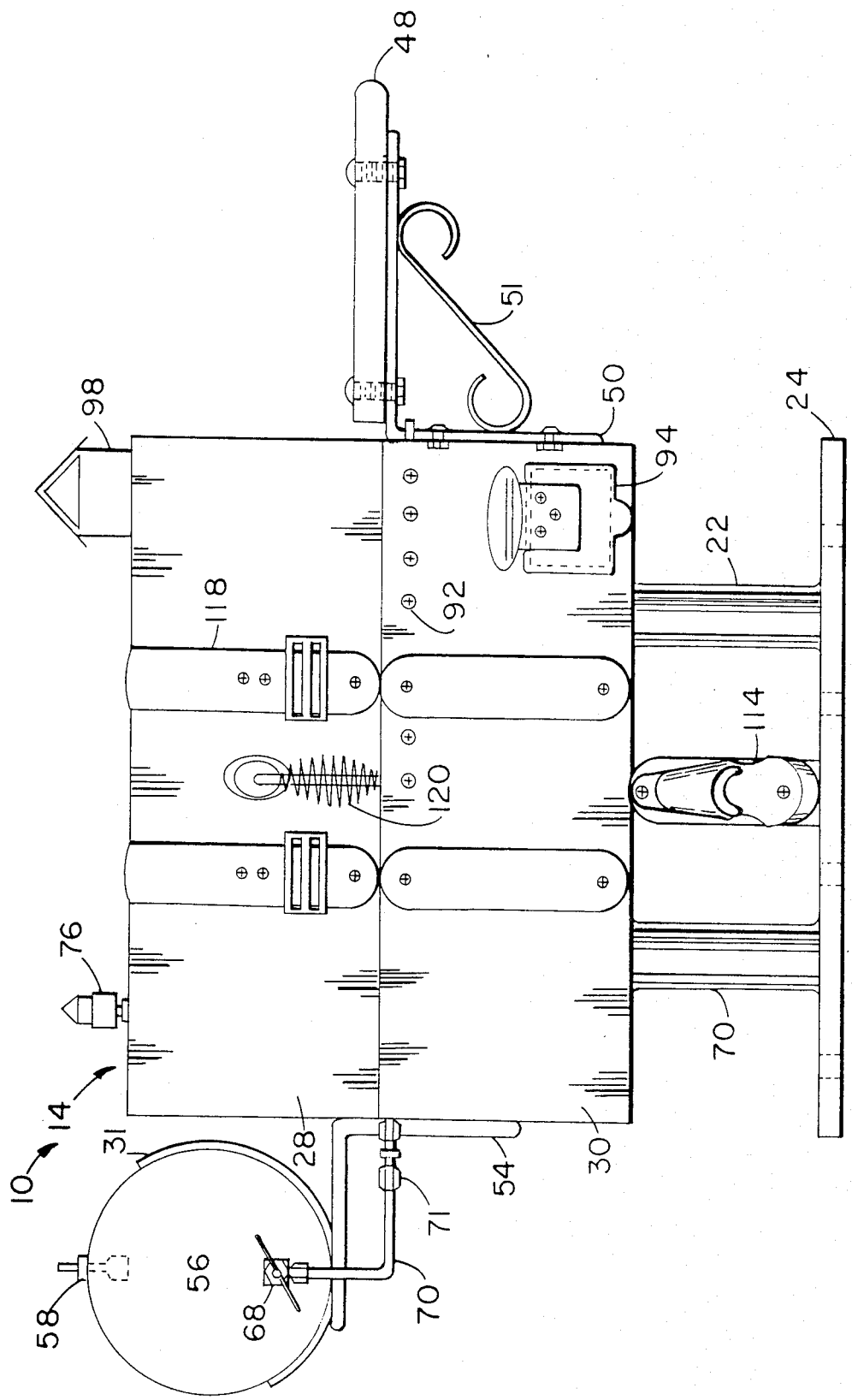
FIG. 2 is a side elevational view thereof.

For appearance, a chrome strap 118 may be affixed on each side of the handle 120 that serves for opening the top (FIG. 2).

FIG. 2 shows external features of the system 10 closed. Water-level indicator appears at 58. Water tank 56 is supported by brackets 54 bolted to the lower part 30 of the housing and having "C"-shaped elements 31 fixed to the tank and brackets. Valve 68 and copper tubing 70 and fittings 71 are conventional. At the top, steam vent valve 76 and chimney 98 show. Handle 120 permits raising the top unit 28 from contact at the horizontal line with the bottom unit 30. Vent holes 92 extend in series along the upper edge of unit 30. Trap door 91 in unit 30 at the bottom provides venting and also for cleanout. Brackets 50 and ornamental brace 51 on the right-hand end support a shelf 48 for convenient deposit of food and utensils. Bottle-opener 114 is held between the housing and the strap 21, between the legs 20 and 22, by welding at each end. Ornamental chrome straps 118 buckles may also stiffen the housing.

Figure 3:
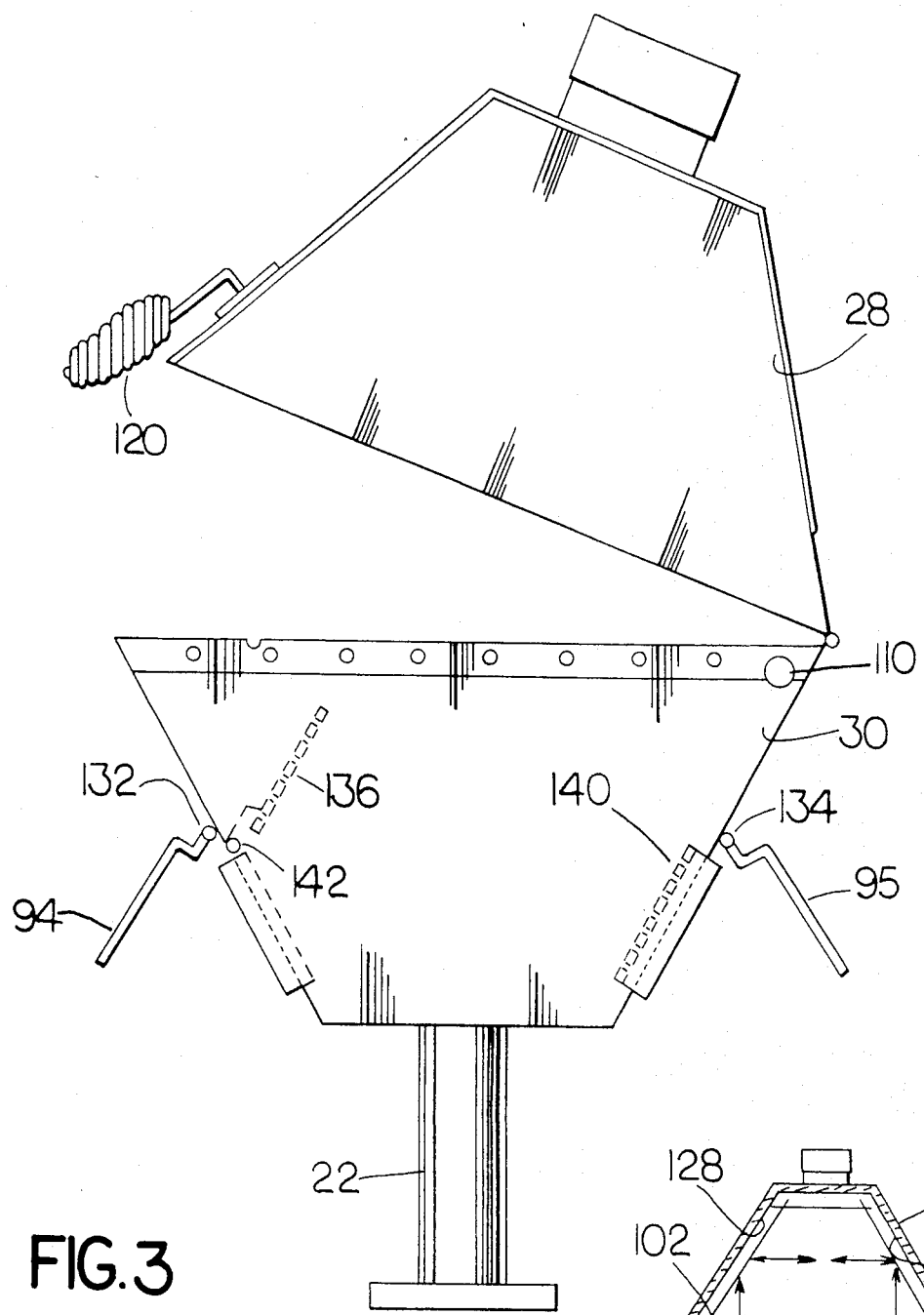
FIG. 3 is an end elevational view thereof; with parts removed.

FIG. 3 diagrams the housing right end and elements close by. The upper and lower units show at 28, 30, leg support at 22, outward-openings door cover plates at 94, 95 with hinges 132, 134, screen door at 136, and vent plates at 140; a hinge 142 is provided for the inward-opening front vent plate only, the rear one being welded shut for safety.

Figure 4:
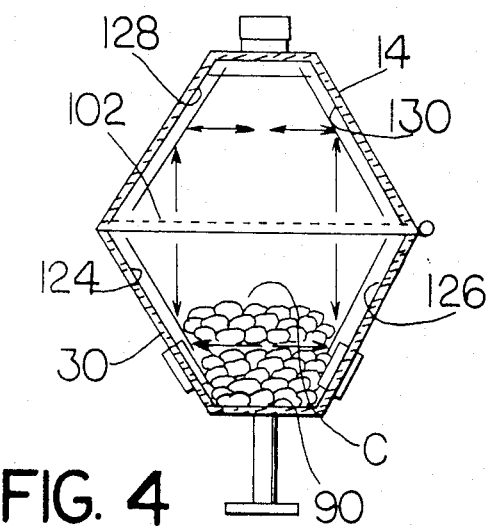
FIG. 4 is a diagram in end-elevation showing thermal reflection paths according to this invention.

FIG. 4 shows an advantageous result of the irregular hexagonal-section shape of the closed housing 14. Burning charcoal C held for economy in the relatively narrow bottom 90 of the base unit 30 between the forty-five degree angled reflector-plate front and rear sides 124, 126, reflects thermal radiation (arrows) from the reflector plate sides 124, 126, upwardly against and through peripheral portions of the grill 102 and food on it. The radiation then reflects laterally from the upper diagonal plates 128, 130 crossing over the center and returning downward on the grill and food on it.

Heat rising directly up from the charcoal produces a central hotter area, but not having the advantages of the reflections described, will cook not excessively more than the peripheral regions, the cooking being more even as a result. The steam oven heats by conduction and steam.

It will be appreciated that the relatively small volume of charcoal can be extinguished quickly when desired, using a relatively small amount of water.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for food preparation by heating, comprising a structure of first and second similar elements meeting at a horizontal plane and joined along a first edge so that the first element serves a downwardly concave lid that can pivot upwardly from the second element, means adapting the second element to serve as an upwardly concave base including means for affixing the second element to a pick-up truck bed coaming, means dividing said structure transversely intermediate the length thereof into a first compartment and a second compartment, means adapting the first compartment for use as a grill, and means adapting the second compartment for use as a steam oven.

2. A system as recited in claim 1, the means adapting the first compartment as a grill including an area at the lower part thereof for holding charcoal, means for providing ventilation for burning said charcoal, means for holding food across an area larger than the area for holding charcoal, and means for reflecting and re-reflecting radiant heat in a rectangular course from the charcoal onto food held across said larger area.

3. A system as recited in claim 2, the means for reflecting and re-reflecting radiant heat comprising said structure including a plurality of flat-plate reflectors.

4. A system as recited in claim 3, said plurality of flat-plate reflectors including a first pair as part of said first element and substantially at right angles to each other and a second pair as part of said second element and substantially at right angles to each other.

5. A system as recited in claim 1, the first pair supported substantially over the second pair in vertical symmetry.

6. A system as recited in claim 5, a horizontally disposed plate between each of the first pair and the second pair, the horizontally disposed plates being substantially equal in size, smaller than said paired plates, and opposing each other.

7. A system as recited in claim 2, the means adapting the second compartment for use as a steam oven comprising: a water tank adjacent the second compartment, tubing leading from the water tank downwardly past the first compartment and passing around the first compartment to an exhaust end low in the second compartment.

8. A system as recited in claim 7, said passing including looping a plurality of times around the first compartment for heating said tubing for making steam.

9. A system as recited in claim 8, and a steam valve for escape of steam high in said first compartment.

10. A system as recited in claim 9, said means for affixing comprising a tubular leg support under each of said first and second compartments, and structure defining holes for drainage through said tubular leg supports.

11. A system for food preparation by heating with burning charcoal beneath a grill, comprising: means for confining said burning charcoal to a first area centrally beneath and substantially smaller than said grill, said grill having margins heated less than said first area, means for evening out said heating to include said margins, including a first diagonal reflector plate laterally of the burning charcoal for reflecting heat upwardly through a said grill margin, a second diagonal reflector plate above the first diagonal reflector plate for receiving heat reflected upwardly through said grill and oriented for reflecting heating laterally above said grill, a third diagonal reflector plate positioned for receiving heat reflected laterally from said second diagonal reflector plate and for reflecting heat downwardly through a further said margin of the grill, and a fourth diagonal reflector plate positioned for receiving heat directed from said third diagonal reflector plate and laterally directing same to the burning charcoal.

12. A system for preparation of food by heating with burning charcoal beneath a grill, the grill having a central area and a marginal area comprising first and second areas lateral of the central area, the burning charcoal arranged directly beneath the central area for heating the central area, means for heating said first and second marginal areas for evening said heating thereof relative to central area, comprising: a plurality of flat plate means for reflecting disposed diagonally relative to said grill and arranged for receiving heat laterally from the burning charcoal, reflecting said received heat upwardly through said first and second marginal areas and laterally over the grill and downward through said first and second areas of the grill, and thereby evening said heating.

* * * * *